June 15, 1943.  R. M. OSTERMANN  2,321,613
LOCOMOTIVE
Filed Aug. 28, 1940  2 Sheets-Sheet 1
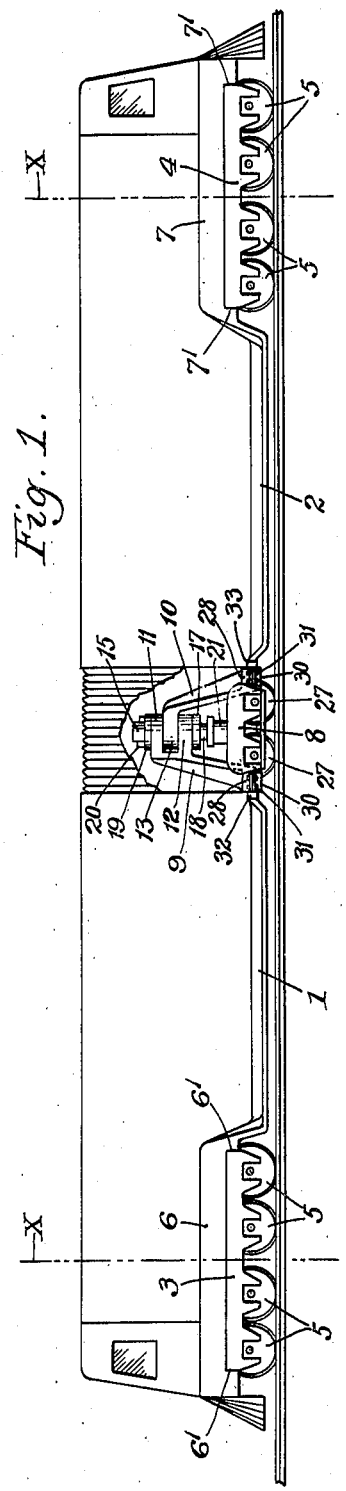
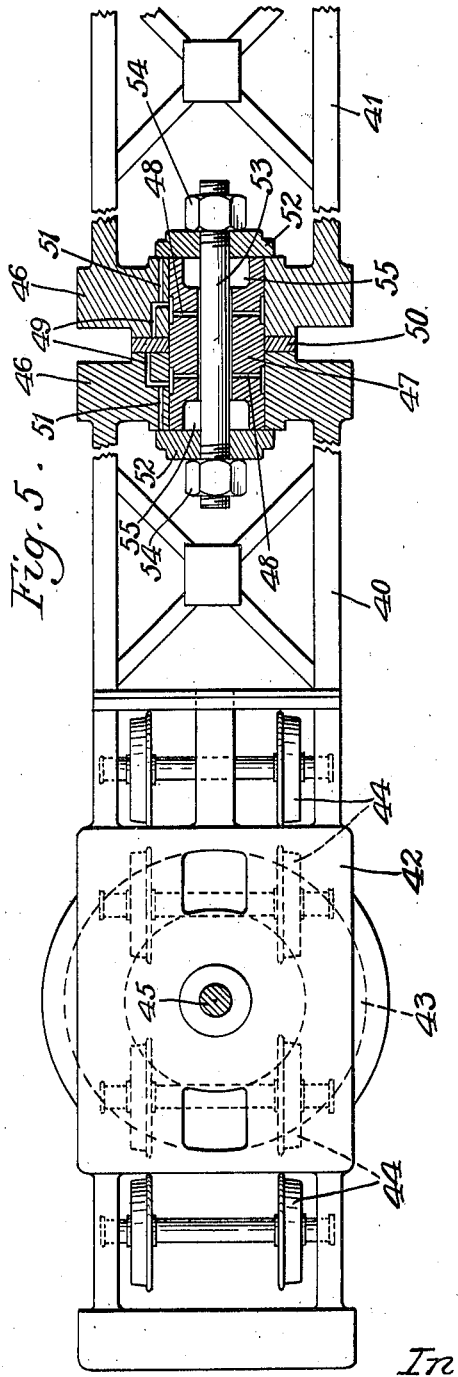
Inventor.
Rudolf M. Ostermann.
by Parker & Carter.
Attorneys.

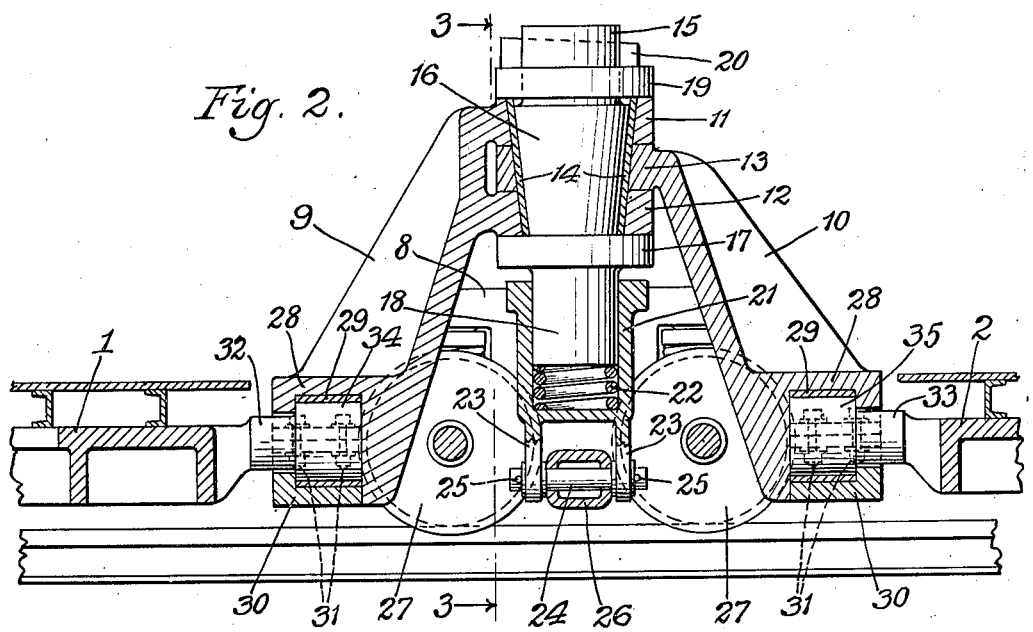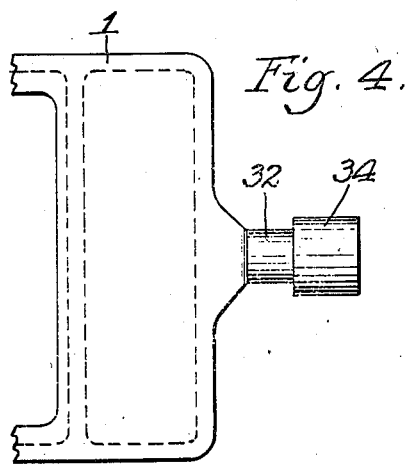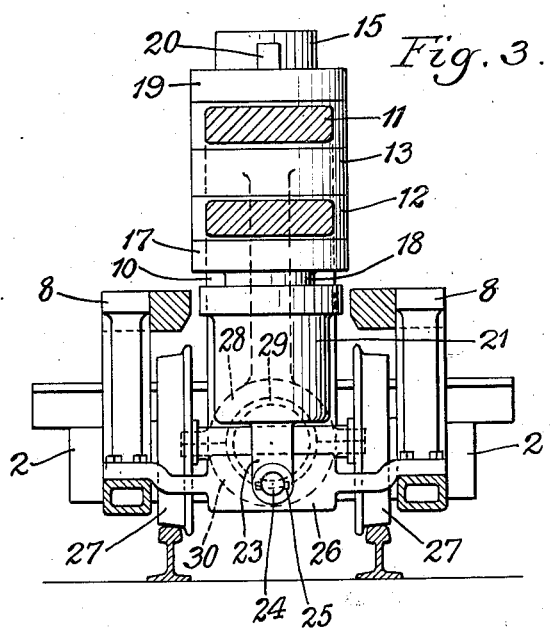

Patented June 15, 1943

2,321,613

UNITED STATES PATENT OFFICE 2,321,613

LOCOMOTIVE

Rudolf M. Ostermann, Kenilworth, Ill.

Application August 28, 1940, Serial No. 354,553

9 Claims. (Cl. 105—175)

This invention relates to a locomotive and, particularly, to means for articulating the locomotive. Among its objects is to provide means for articulating a locomotive to permit relative movement of parts of the locomotive about a generally vertical axis. Another object is to provide means for relative movement of locomotive parts with respect to each other about a horizontal axis; and a third object is to provide means in a locomotive frame or structure for permitting relative movement of the locomotive parts or frame parts about both vertical and horizontal axes. Where the expression "locomotive parts" has been used, it refers to structural parts of the locomotive and does not refer to such relative movement of parts as occurs when the wheels rotate or when parts of the driving means, or otherwise, move with respect to other parts of the driving means. Other objects, in addition to those above mentioned, will appear from time to time throughout the specification and the claims.

The invention is illustrated more or less diagrammatically in the accompanying drawings, wherein:

Figure 1 is a side elevation of one form of a locomotive;

Figure 2 is a longitudinal vertical cross section taken on an enlarged scale and illustrating the central articulated joint of the form of the invention illustrated in Figure 1;

Figure 3 is a transverse vertical section taken at line 3—3 of Figure 2;

Figure 4 is a plan view illustrating a portion of the mechanism shown in Figure 2;

Figure 5 is a plan view with parts broken away and parts in section illustrating a modified form of mechanism in which means are provided for accomplishing relative movement about a horizontal plane.

Like parts are designated by like characters throughout the specification and the drawings.

In the form shown in the first four figures, the locomotive comprises generally two frame members or assemblies 1 and 2, which are supported, respectively, on swivel trucks 3 and 4 upon each of which are mounted wheels 5, 5. The swivel trucks are arranged to swivel about axes X, X and are held against movement other than swiveling about these axes with respect to the locomotive frame. The upper part of the trucks 3, 4 comprises parts of turn-tables which rotate about the axes X in portions 6 and 7, respectively, of the frame members 1 and 2. There is a surface contact between the members 3 and 6 and the members 4 and 7 sufficiently extended to serve as stop means against lateral tilting or swaying. Shoulders 6', 6' are formed in the frame section 6 and shoulders 7', 7' are formed in the frame member 7. The ends of the swivel trucks 3 and 4 abut, respectively, against the surfaces 6' and 7' which comprise abutments formed about arcs concentric with the respective axes X, X. The ends of the swivel frames 3 and 4 are arcuate to correspond to the abutments 6' and 7'. The swivel truck construction thus permits swiveling of each swivel truck about its axis but holds the swivel truck against movement with respect to the locomotive frame in any other direction.

A centering truck 8 is mounted between the locomotive sections 1 and 2. There are associated with the truck 8 and with the frame members 1 and 2, above described, hinge castings 9 and 10, the casting 9 being connected to the frame member 1 and the casting 10 to the frame member 2. The casting 9 has two perforated members 11 and 12; and the casting 10 has a perforated member 13 which is spaced between the members 11 and 12. The perforations of the three members 11, 12 and 13 are preferably inclined and graduated in size as shown particularly in Figure 3, and a bushing or liner 14 may be positioned within these perforations as shown in that figure. A hinge pin 15 is positioned within these perforations and is provided with a relatively conical or tapered portion 16 which lies within the liner 14. It is provided also with a shoulder or laterally extending flange 17 and with a generally cylindrical plunger 18. A disc 19 is positioned upon the upper surface of the member 11 and about the hinge pin 15; and a wedge 20 may be driven through a corresponding opening in the upper end of the hinge pin. By this construction, the hinge parts may be pressed tightly together to whatever degree of tightness is desired.

The plunger section 18 is movably received within a cylinder 21, the bottom of which is closed and within which is positioned a spring 22. The cylinder itself is provided below its closed bottom with a pair of perforated ears 23, 23, through which a pin 24 passes. The pin is held in place by cotter pins 25, 25, or otherwise. The pin 24 is received in a suitable perforation in a cross member 26 which forms a part of the centering truck 8. The hinge assembly above described is thus permitted slight tilting movement with respect to the rest of the centering truck and its point or center of tilting movement is positioned very low in the truck. As shown, particularly in Figures 2 and 3, this point is only slightly above the tops of the rails upon which the truck runs. The truck is mounted on pairs of wheels 27, 27 and may be spring supported in any suitable manner.

Each of the hinge sections 9 and 10 is provided with a semi-cylindrical hollow portion 28 within which a bushing or liner 29 may be mounted. To complete the bearing a semi-cylindrical portion 30 is secured to each portion 28 by means of bolts 31, 31 or otherwise. The frame members 1 and 2 are provided with extensions 32, 33, respectively, each of which has an enlarged and preferably shouldered portion 34, 35, respectively, these portions being received in the bearings formed of the members 28 and 30 so that the frame sections 1 and 2 may rotate with respect to the hinge members in which they are received about a generally horizontal axis.

In the modified form of the invention shown in Figure 5, no vertical hinge member is provided and relative movement of the locomotive frame parts occurs only about a horizontal axis. In the form of the device here shown, there are two frame sections 40 and 41. Each is provided with a turn-table portion 42 and each is supported upon a swiveled, wheeled truck which includes a turn-table portion 43, wheels 44—spring supported, if desired—and a central axis defining member 45. The construction of this turntable is generally the same as that described in connection with Figure 1. It is such that swiveling of the wheeled frame with respect to the locomotive frame can occur but other relative movements of these frames are prevented.

At its inner end each frame section is provided with a joint member 46, which is hollow centrally to receive a sleeve 47. The sleeve is provided with lubricant ducts 48 which are in communication with other lubricant ducts 49 formed in the sections 46 and communicating with their inner faces. Between the inner faces of the members 46 and about the sleeve 47 is mounted a washer or ring 50. Other lubricant ducts 51, 51 may communicate with the opposite faces of the members 46. Against these faces bearing plates 52 are positioned and these may be lubricated through the ducts 51. A pin 53 extends through the sleeve and through the bearing plates 52 and is held in place by nuts 54.

The sleeve 47 may, if it is desired, be provided at each end with a cavity 55 which serves as a storage and supply means for a lubricant.

Although there is shown an operative form of the device, it will be understood that many changes in the form, shape and arrangement of parts might be made without departing from the spirit of this invention, and it is wished that the showing be taken as, in a sense, diagrammatic.

In the form of the invention shown in the first four figures, the amount of load carried by the central guiding truck is optional. By changing the length and power of the spring 22, more or less of the load of the locomotive may be carried through the spring to the truck. While the main purpose of the central truck is to guide so that the central portion of the locomotive body follows the track and consequently reduces the "over-hang" which would occur if the central hinge were not provided, this guiding truck may, if desired, be arranged to carry more or less of the engine load. Ordinarily, it will carry no load in the case of a relatively light locomotive but as heavier loads are carried by the locomotive the guiding truck will be arranged to carry an increased percentage of that load. Where the locomotive is originally designed to put some of the load on the guiding truck the spring 22 will be arranged to accomplish this. Automatic means may be provided for varying the effect of the spring 22 in response to variation in the load or weight of the locomotive body, such, for example, as changes in the quantity of fuel and other variables in engine operation. It is to be understood that if a locomotive were made sufficiently short so that the "over-hang" was unimportant, the hinge construction would not ordinarily be necessary and consequently the guiding truck would not ordinarily be necessary. Some means other than a truck might be substituted for guiding the hinge.

I claim:

1. In combination in a locomotive, a pair of main tractive and housing frame sections, a plurality of trucks, one connected to each of said frame sections and mounted for swiveling with respect thereto and means holding it against any other relative movement, and means joining the said frame sections, said means comprising a joint arranged for relative, rotational movement of the frame sections only about a single common axis.

2. In combination in a locomotive, a single pair of main frame sections, a plurality of trucks, one connected to each of said frame sections and mounted for swiveling with respect thereto and means holding it against any other relative movement, and means joining the said frame sections, said means comprising a joint arranged for movement about a single substantially vertical axis only, and an additional connection separate from said joint joining each of said frame sections to said joint, each of said connections shaped to allow movement of said frame sections about a substantially horizontal axis only, and a guiding truck for said joint.

3. In combination in a locomotive, a pair of frame sections, each shaped to provide an extended turntable portion, a plurality of trucks, one connected to each of said frame sections and in extended contact with one of said turntable portions, and mounted for swiveling with respect thereto and held by said turntable against any other relative movement, and means joining the said frame sections, said means comprising a self-supporting joint arranged for movement of said frame sections about a substantially horizontal axis.

4. In combination in a locomotive, a pair of frame sections, each shaped to provide an extended turntable portion, a plurality of trucks, one connected to each of said frame sections and in extended contact with one of said turntable portions and mounted for swiveling with respect thereto and held against any other relative movement, and means joining the said frame sections, said means comprising a hinge joint arranged for movement only about a substantially vertical axis, and a truck associated with said hinge joint, and connections additional to said hinge joint joining each of said frame sections to said hinge joint, said connections shaped to allow movement only about a substantially horizontal axis.

5. In combination in a locomotive, a pair of frame sections, each shaped to provide an extended turntable portion, a plurality of trucks, one connected to each of said frame sections and in extended contact with one of said turntable portions and mounted for swiveling with respect thereto and held by said turntable against any other relative movement, and means joining the ends of said frame sections positioned away from said trucks, said means comprising a self-supporting hinge joint arranged for movement only about a substantially vertical axis, and a guiding truck connected to said hinge joint, and adapted to steer it with respect to the track upon which the locomotive runs, and connections joining each of said frame sections to said hinge joint, said connections shaped to allow movement only about a substantially horizontal axis.

6. In combination in a locomotive, a plurality of frame sections, each shaped to provide a turntable portion, a plurality of wheeled trucks, one swiveled to each of said frame sections and in extended contact with one of said turntable portions, the contacting parts of said trucks and turntable portions shaped to prevent any relative movement except swiveling, said frame sections being connected to each other at points separated from said trucks, and connection means for connecting said frame sections and including members, providing a joint having an axis substantially at right angles to the general plane of said frame sections, a guiding truck attached to said joint and adapted to guide it with respect to the track upon which said locomotive runs, each of said frame sections being connected to said joint by means of a rotary connection having an axis substantially at right angles to the axis of said joint.

7. In combination in a locomotive, a pair of frame sections, said frame sections comprising the main tractive and body frames of the locomotive, swivel trucks secured one to each of said sections and supporting it, and means joining the sections together for movement only about a generally horizontal axis, and means for holding them against other relative movement.

8. In combination in a locomotive, a pair of frame sections, and a plurality of trucks, one adjacent each end of said locomotive, each supporting the outer end of one of said frame sections, a turntable for each of said end supporting trucks, so arranged that the trucks are held against all motion with relation to the said frame sections except a swiveling motion about a substantially vertical axis, means connecting the said frame sections at their adjoining ends, said means comprising a self-supporting joint between the two, arranged for swivel of said frame sections about a substantially horizontal axis only.

9. In combination a locomotive, a pair of frame sections, swivel trucks secured one to each of said sections and supporting it, and means joining said sections together for relative movement, said joining means shaped to prevent downward movement of the joined ends of said frame sections.

RUDOLF M. OSTERMANN.